US009444184B2

(12) United States Patent
Beebe

(10) Patent No.: US 9,444,184 B2
(45) **Date of Patent: *Sep. 13, 2016**

(54) SYSTEM AND METHOD FOR RELEASABLY COUPLING A FLUID DISPENSER TO A DISPENSING SYSTEM

(71) Applicant: Fishman Corporation, Hopkinton, MA (US)

(72) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,917

(22) Filed: Jul. 14, 2014

(65) Prior Publication Data

US 2015/0004820 A1 Jan. 1, 2015

Related U.S. Application Data

(63) Continuation of application No. 13/432,264, filed on Mar. 28, 2012, now Pat. No. 8,777,063.

(60) Provisional application No. 61/468,239, filed on Mar. 28, 2011.

(51) Int. Cl.
*F16B 17/00* (2006.01)
*H01R 13/629* (2006.01)
(Continued)

(52) U.S. Cl.
CPC ............ *H01R 13/629* (2013.01); *B05B 15/06* (2013.01); *B05C 5/0208* (2013.01); *F16B 17/00* (2013.01);

(Continued)

(58) Field of Classification Search
CPC .................. A47K 2005/1218; A47K 5/1217; B05B 15/06; B05B 5/0208; F16B 17/00; F16N 11/08; G01F 11/022; H01R 13/629
USPC ...... 222/174, 175, 179.5, 180, 181.1, 181.2, 222/181.3, 333, 63; 403/305; 439/190
See application file for complete search history.

(56) References Cited

U.S. PATENT DOCUMENTS 4,059,110 A 11/1977 Wuthrich et al.
4,326,517 A * 4/1982 Whitney .............. A61B 5/0215 604/155

(Continued)

FOREIGN PATENT DOCUMENTS

CN 1503753 10/2000
CN 1268472 10/2001

(Continued)

OTHER PUBLICATIONS

International Search Report and Written Opinion of the International Searching Authority issued in corresponding PCT application No. PCT/US2012/030826, mailed Oct. 31, 2012 (11 pages).

(Continued)

*Primary Examiner* — Frederick C Nicolas
*Assistant Examiner* — Bob Zadeh
(74) *Attorney, Agent, or Firm* — Mark H. Whittenberger; Michael T. Abramson; Holland & Knight LLP

(57) ABSTRACT

A system and method for releasably coupling a fluid dispenser to a structure. There is a push to connect-pull to disconnect connector system that has first and second mating connectors. A first connector is mounted to the dispenser and a second connector is mounted to the structure. The connector system accomplishes both mechanical and electrical interconnection between the dispenser and the structure.

20 Claims, 11 Drawing Sheets

(51) Int. Cl.
*B05B 15/06* (2006.01)
*B05C 5/02* (2006.01)
*B05C 11/10* (2006.01)

(52) U.S. Cl.
CPC .......... *B05C 5/0225* (2013.01); *B05C 11/1034* (2013.01); *Y10T 29/49826* (2015.01); *Y10T 403/70* (2015.01)

(56) References Cited

U.S. PATENT DOCUMENTS

| | | | | |
|---|---|---|---|---|
| 4,962,871 | A * | 10/1990 | Reeves | B05C 5/0225 222/504 |
| 5,021,046 | A * | 6/1991 | Wallace | A61M 25/1018 128/205.23 |
| 5,449,345 | A | 9/1995 | Taylor et al. | |
| 6,341,719 | B2 | 1/2002 | Villa | |
| 6,743,205 | B2 | 6/2004 | Nolan, Jr. et al. | |
| 7,150,724 | B2 | 12/2006 | Morris et al. | |
| 7,686,789 | B2 | 3/2010 | Nemoto et al. | |
| 8,070,077 | B2 * | 12/2011 | de Leeuw | B05C 5/0225 239/690 |
| 8,777,063 | B2 * | 7/2014 | Beebe | B05B 15/06 222/1 |
| 2004/0210192 | A1 | 10/2004 | Degentesh et al. | |
| 2007/0191787 | A1 | 8/2007 | Lim et al. | |
| 2008/0190518 | A1 * | 8/2008 | Luechinger et al. | 141/390 |
| 2010/0094208 | A1 | 4/2010 | Branchetti | |
| 2012/0252242 | A1 | 10/2012 | Beebe | |
| 2015/0004820 | A1 * | 1/2015 | Beebe | B05B 15/06 439/190 |

FOREIGN PATENT DOCUMENTS

| | | | |
|---|---|---|---|
| CN | 1324273 | 11/2001 | |
| DE | 202005012870 U1 | 8/2005 | |
| DE | 202005012870 | * 12/2005 | G01F 11/04 |
| EP | 1402957 | 3/2004 | |
| JP | 11067343 | 3/1999 | |
| JP | 2000208206 | 7/2000 | |
| JP | 2008272710 | 11/2008 | |
| WO | 2010026559 | 3/2010 | |

OTHER PUBLICATIONS

Final Office Action from related U.S. Appl. No. 13/432,264 dated Dec. 11, 2013 (8 pages).
Non-Final Office Action from related U.S. Appl. No. 13/432,264 dated Jul. 5, 2013 (10 pages).
Notice of Allowance and Fee(s) Due from related U.S. Appl. No. 13/432,264 dated Mar. 13, 2014 (9 pages).
First Office Action issued in related Chinese Application Serial No. 201280015619.9 dtd. Feb. 2, 2015.
Patent Examination Report No. 1 issued in Australian related Application Serial No. 2012236625 on Dec. 11, 2014.
Office Action issued in related Russian Application Serial No. 2013147815 on Dec. 9, 2015.
Office Action issued in related Japanese Application Serial No. 2014-502730 on Feb. 16, 2016.

* cited by examiner

SYSTEM AND METHOD FOR RELEASABLY COUPLING A FLUID DISPENSER TO A DISPENSING SYSTEM

CROSS-REFERENCE TO RELATED APPLICATION

This patent application claims the benefit of U.S. patent application Ser. No. 13/432,264 filed on Mar. 28, 2012, entitled "System and Method for Releasably Coupling a Fluid Dispenser to a Dispensing System," which claims priority to U.S. Provisional Application No. 61/468,239, filed on Mar. 28, 2011, entitled "System and Method for Releasably Coupling a Fluid Dispenser to a Dispensing System," the contents and teachings of each of which are hereby incorporated by reference in their entirety.

FIELD

This disclosure relates to the coupling of a fluid dispenser to a fluid dispensing system.

BACKGROUND

There are many situations in which it is desirable to dispense small controlled amounts of fluid in a specific location. One example is the dispensing of an adhesive in an automated production line, such as dispensing a fraction of a milliliter of UV-cured adhesive at the base of the needle of a hypodermic assembly where the adhesive is cured so as to hold the needle in place in the plastic base. There are myriad other situations in which small controlled amounts of fluid need to be dispensed very exactly.

In a production environment it is desirable to have as few interruptions as possible to an automated assembly line. One interruption occurs when a fluid dispenser needs to be refilled or replaced; the line must be halted, the fluid dispenser removed, and a full dispenser placed properly into position. Many assembly lines use several fluid dispensers, each of which needs to hold fluid. This situation leads to the need to stop production fairly frequently so as to replace empty fluid dispensers. It is thus desirable to design the fluid dispensing system in a manner that allows the fluid dispensers to be replaced as quickly as possible.

SUMMARY

In general, one aspect of the disclosure features a system for releasably coupling a fluid dispenser to a structure. There is a push to connect-pull to disconnect connector system that has first and second mating connectors. The fluid dispenser is mounted to a first connector. The second connector is mounted to the structure. The connector system accomplishes releasable mechanical interconnection between the dispenser and the structure, and in most but not all embodiments also accomplishes electrical interconnection between the dispenser and the structure.

Various implementations may include one or more of the following features. The structure may be a fluid dispensing system. The fluid dispenser may comprise a syringe with a dispensing plunger. The fluid dispenser may further comprise a stepper motor operably connected to the syringe and adapted to move the plunger, and wherein the connector system further accomplishes an electrical interconnection between the dispenser and the structure. The fluid dispenser may further comprise a dispenser housing in which the stepper motor is located. The first connector may be mounted to the dispenser housing by one or more straps. The dispenser housing may define an outer shape, and the first connector may define an outer shape that is essentially a mirror image of the outer shape of the dispenser housing, such that the first connector is mounted to the dispenser housing with little space between them.

The first connector may have a connector body that defines a connector face entirely circumscribed by a projecting rim, with the male portion of a male/female electrical connector projecting outward from the connector face and a plurality of post-receiving openings defined in the face on different sides of the projecting electrical connector. The second connector may have a connector body that defines a connector face entirely circumscribed by a plurality of projecting flexible fingers that project outward from the body, wherein the fingers each define a groove near their distal end such that the fingers are adapted to snap over the rim of the first connector and the rim is sized and shaped to be accepted into the grooves, to accomplish a positive locking of the two connectors. The second connector may further define a plurality of posts projecting outwardly from the face and located, sized and shaped to fit into the receiving openings of the first connector when the rim is received in the grooves. The second connector may further define a female portion of the male/female electrical connector, which is located sized and adapted to receive the male electrical connector portion.

In general, another aspect of the disclosure features a method for accomplishing simple and fast coupling and decoupling of a fluid dispenser to a dispensing system. There is a push to connect-pull to disconnect connector system comprising first and second mating connectors, with a first connector adapted to be mounted to the dispenser and a second connector adapted to be mounted to the dispensing system, wherein the connector system accomplishes both mechanical and electrical interconnection between the dispenser and the dispensing system. The dispenser and the dispensing system are mechanically and electrically coupled together by pushing a first connector into the second connector, and are mechanically and electrically decoupled by pulling the first connector away from the second connector.

Various implementations may include one or more of the following features. The fluid dispenser may comprise a syringe with a dispensing plunger, wherein the fluid dispenser further comprises a stepper motor operably connected to the syringe and adapted to move the plunger, and wherein the fluid dispenser further comprises a dispenser housing in which the stepper motor is located. The first connector may be mounted to the dispenser housing by one or more straps. The dispenser housing may define an outer shape and the first connector may define an outer shape that is essentially a mirror image of the outer shape of the dispenser housing such that the first connector is mounted to the dispenser housing with little space between them.

The first connector may have a connector body that defines a connector face entirely circumscribed by a projecting rim, with the male portion of a male/female electrical connector projecting outward from the connector face and a plurality of post-receiving openings defined in the face on different sides of the projecting electrical connector. The second connector may have a connector body that defines a connector face entirely circumscribed by a plurality of projecting flexible fingers that project outward from the body, wherein the fingers each define a groove near their distal end such that the fingers are adapted to snap over the rim of the first connector and the rim is sized and shaped to be accepted into the grooves, to accomplish a positive locking of the two connectors. The second connector may further define a plurality of posts projecting outwardly from the face and located, sized and shaped to fit into the receiving openings of the first connector when the rim is received in the grooves. The second connector may further define a female portion of the male/female electrical connector, which is located sized and adapted to receive the male electrical connector portion.

In general, another aspect of the disclosure features a connector system for accomplishing simple and fast coupling and decoupling of a fluid dispenser to a dispensing system, comprising a push to connect-pull to disconnect connector system comprising first and second mating connectors, with a first connector adapted to be mounted to the dispenser and a second connector adapted to be mounted to the dispensing system, wherein the connector system accomplishes both mechanical and electrical interconnection between the dispenser and the dispensing system. The first connector is mounted to the dispenser such that it lies against a portion of the dispenser, the mounting accomplished by one or more straps that are coupled to the first connector and encircle the dispenser.

Various implementations may include one or more of the following features. The fluid dispenser may comprise a syringe with a dispensing plunger, wherein the fluid dispenser further comprises a stepper motor operably connected to the syringe and adapted to move the plunger, and wherein the fluid dispenser further comprises a housing for the stepper motor. The dispenser housing may define an outer shape and the first connector may define an outer shape that is essentially a mirror image of the outer shape of the dispenser housing such that the first connector is mounted to the dispenser housing with little space between them. The first connector may have a connector body that defines a connector face entirely circumscribed by a projecting rim, with the male portion of a male/female electrical connector projecting outward from the connector face and a plurality of post-receiving openings defined in the face on different sides of the projecting electrical connector. The second connector may have a connector body that defines a connector face entirely circumscribed by a plurality of projecting flexible fingers that project outward from the body, wherein the fingers each define a groove near their distal end such that the fingers are adapted to snap over the rim of the first connector and the rim is sized and shaped to be accepted into the grooves, to accomplish a positive locking of the two connectors. The second connector may further define a plurality of posts projecting outwardly from the face and located, sized and shaped to fit into the receiving openings of the first connector when the rim is received in the grooves. The second connector may further define a female portion of the male/female electrical connector, which is located sized and adapted to receive the male electrical connector portion. The fluid may be a viscous adhesive.

DETAILED DESCRIPTION

Figure 1:
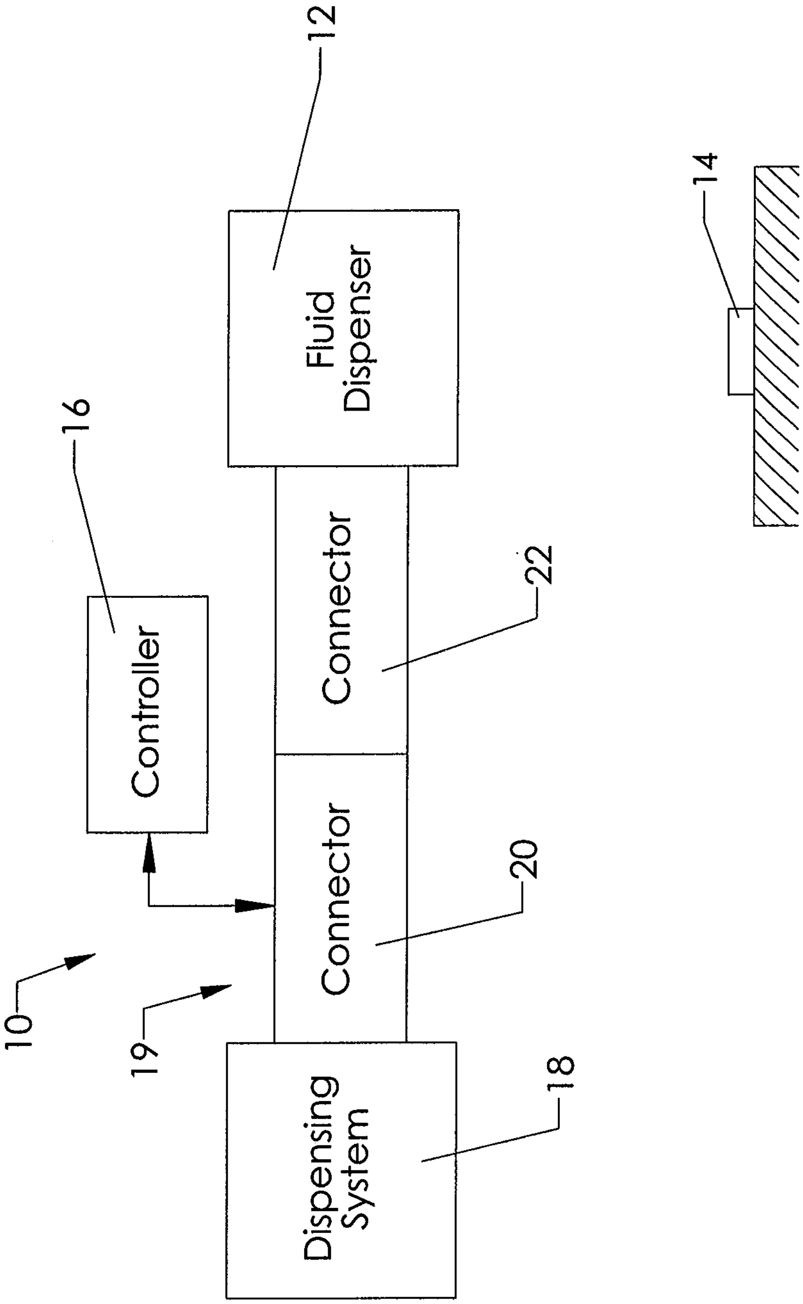
FIG. 1 is a schematic view of a system for releasably coupling a fluid dispenser to a dispensing system.

The embodiments depicted in the drawings accomplish a system that releasably couples an automated dispenser for a liquid adhesive to another structure. As one example the dispenser can be coupled to an automation platform that is automatically moved (typically in two, three or six degrees of freedom) by a control system. The platform can be part of an adhesive dispensing system. The coupling system uses a two part push to connect-pull to disconnect connector structure or system that in most embodiments accomplishes both a mechanical and an electrical interconnection of the fluid dispenser to the dispensing system. The dispensing system carries one connector, and the other connector is coupled to the fluid dispenser. The connector system allows the dispenser to be removed from the dispensing system simply by pulling the dispenser off of the dispensing system. Since the electrical control signals and power to operate the dispenser are provided to the dispenser through the connector, there are no separate or additional control or power wires or cables connected to the fluid dispenser. Thus the dispenser with mounted connector can be removed from the system without the need to unplug or otherwise handle a separate cable running to the dispenser. The coupling disclosed herein can be used for dispensers for fluids other than adhesives. Typically but not necessarily the dispensers are used in automated manufacturing operations.

System 10 for releasably coupling a fluid dispenser to a structure is shown in FIG. 1. Fluid dispenser 12 is adapted to dispense a controlled amount of fluid onto structure 14. In one example, the fluid is a viscous adhesive and dispenser 12 is adapted to dispense a very carefully defined amount of fluid in a defined location or locations of structure 14. Dispensing system 18 may be fixed, or may be a movable platform that can be moved in one or more of the X, Y and Z directions, and possibly in up to six degrees of freedom, as is known in the field.

Controller 16 controls operation of fluid dispenser 12. Controller 16 can be programmed, for example using a programmable logic controller (PLC) or over a network (not shown). Fluid dispenser 12 operates to dispense the fluid; in one non-limiting embodiment the dispensing is accomplished with a stepper motor. Dispenser energizing signals are provided via connector 22 that is permanently or semi-permanently connected to dispenser 12. Connector 22 is releasably, and mechanically and electrically, coupled to connector 20. Connector 20 is permanently or semi-permanently coupled to dispensing system 18. Connectors 20 and 22 can be the two mating portions of a two-part mechanical and electrical push-pull type connector system 19.

Results of system 10 are that an empty fluid dispenser can be removed from the dispensing system simply by pulling the dispenser away from the dispensing system to dislodge connector 22 from connector 20. A replacement fluid dispenser filled with a pre-determined amount of fluid can then be added simply by pushing the connector 22 that is mounted to the filled fluid dispenser onto connector 20. This allows quick and simple replacement without the need to loosen any brackets or other hardware that is typically used to couple a fluid dispenser to a fluid dispensing system.

Figure 2:
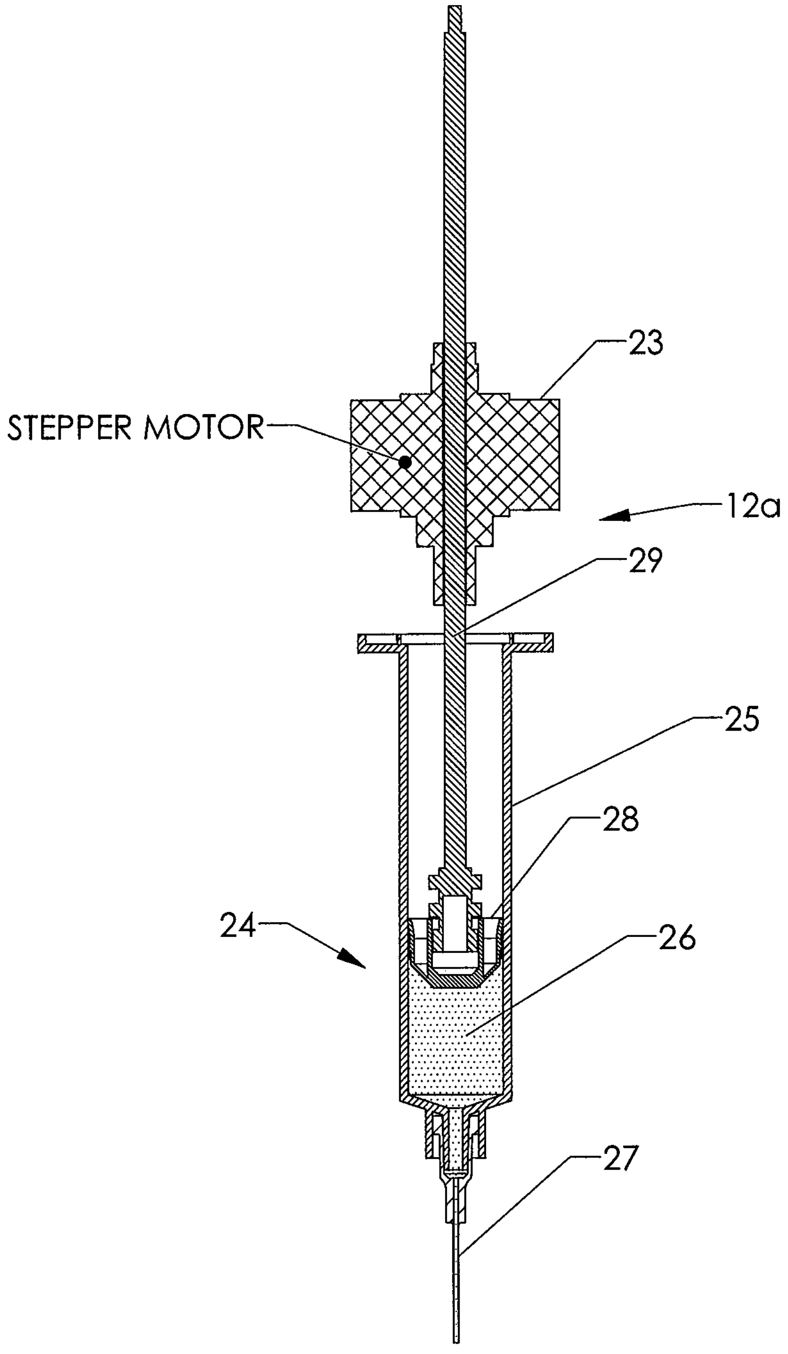
FIG. 2 is a schematic partially cross-sectional view of a fluid dispenser.

An example of a fluid dispenser **12*a* is shown in FIG. 2. Stepper motor 23 is adapted to move output shaft (e.g., lead screw) 29 up and down in a series of very small, carefully controlled steps. Plunger 28 is coupled to the distal end of shaft 29 and fits within chamber 25 of dispensing syringe 24. Fluid 26 fills the volume of syringe 24 between plunger 28 and the distal tip of dispensing nozzle (e.g., needle) 27. With this arrangement, when stepper motor 23 is incremented one step, a very small amount of fluid is dispensed from tip 27**.

In one non-limiting example, there are a series of three dispense guns that can each operate syringes such as that shown in FIG. 2, with volumes of 3, 5, 10 and 30 ml. One dispense gun (the "SDAV" gun) has a stepper motor with a travel of 0.000125" per step. A second gun (the "MDAV" gun) has a stepper motor with a travel of twice that of the SDAV or 0.00025" per step. A third gun (the "LDAV" gun) has a stepper motor with a travel of twice that of the MDAV, or 0.0005" per step. The information below indicates the volume per step for each of the four syringe volumes, for each of these three dispense gun models.

SDAV Dispensing Gun 1 step with a 3 cc syringe barrel will yield 0.00023 cc of fluid dispensed.
1 step with a 5 cc syringe barrel will yield 0.00039 cc of fluid dispensed.
1 step with a 10 cc syringe barrel will yield 0.00065 cc of fluid dispensed.
1 step with a 30 cc syringe barrel will yield 0.00129 cc of fluid dispensed.

MDAV Dispensing Gun 1 step with a 3 cc syringe barrel will yield 0.00045 cc of fluid dispensed.
1 step with a 5 cc syringe barrel will yield 0.00079 cc of fluid dispensed.
1 step with a 10 cc syringe barrel will yield 0.00131 cc of fluid dispensed.
1 step with a 30 cc syringe barrel will yield 0.00257 cc of fluid dispensed.

LDAV Dispensing Gun 1 step with a 3 cc syringe barrel will yield 0.00090 cc of fluid dispensed.
1 step with a 5 cc syringe barrel will yield 0.00158 cc of fluid dispensed.
1 step with a 10 cc syringe barrel will yield 0.00261 cc of fluid dispensed.
1 step with a 30 cc syringe barrel will yield 0.00514 cc of fluid dispensed.

Figure 3:
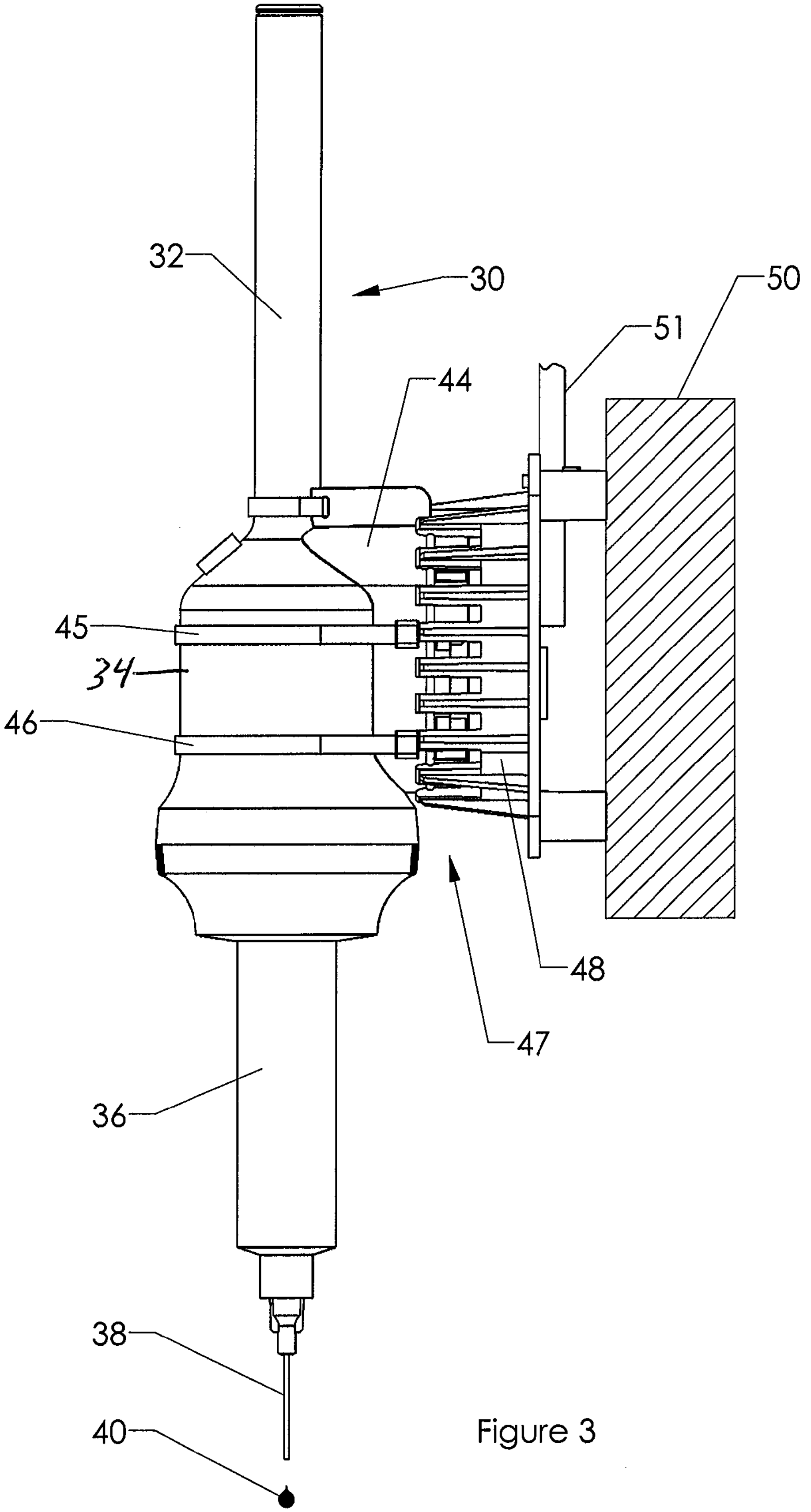
FIG. 3 shows a fluid dispenser and a connector system.
Figure 4:
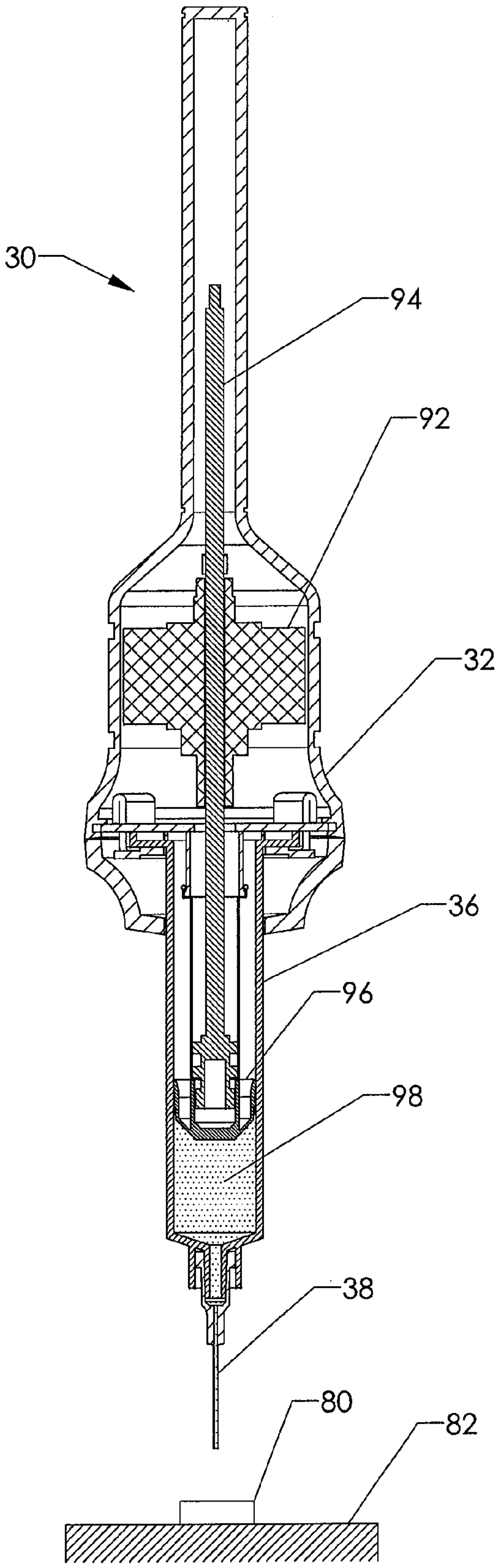
FIG. 4 is a cross-sectional view of the fluid dispenser of FIG. 3.
Figure 5:
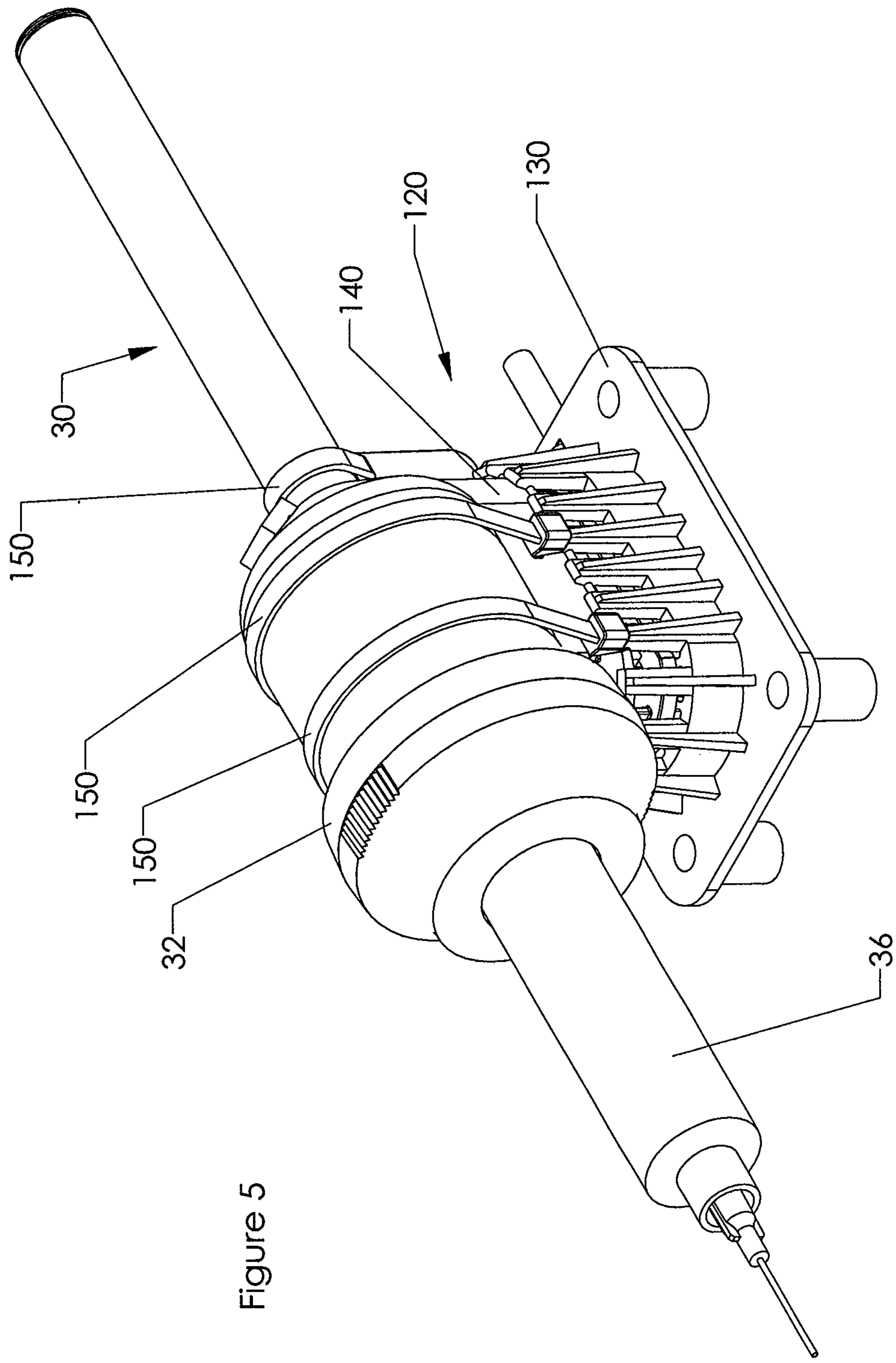
FIG. 5 is a perspective view of a fluid dispenser and two connectors of a connector system.
Figure 6:
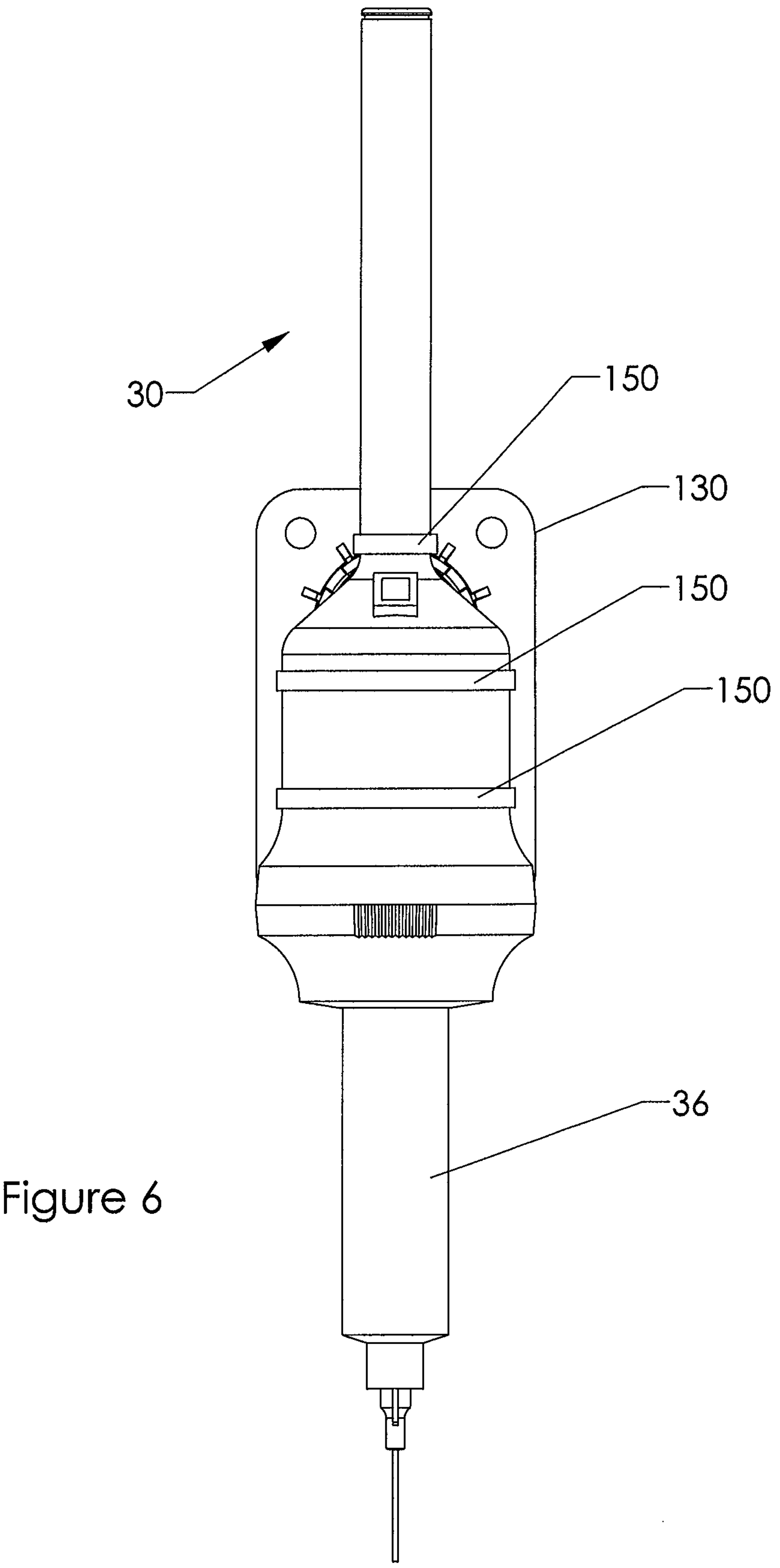
FIG. 6 is a front view of the fluid dispenser and connectors of FIG. 5.
Figure 8:
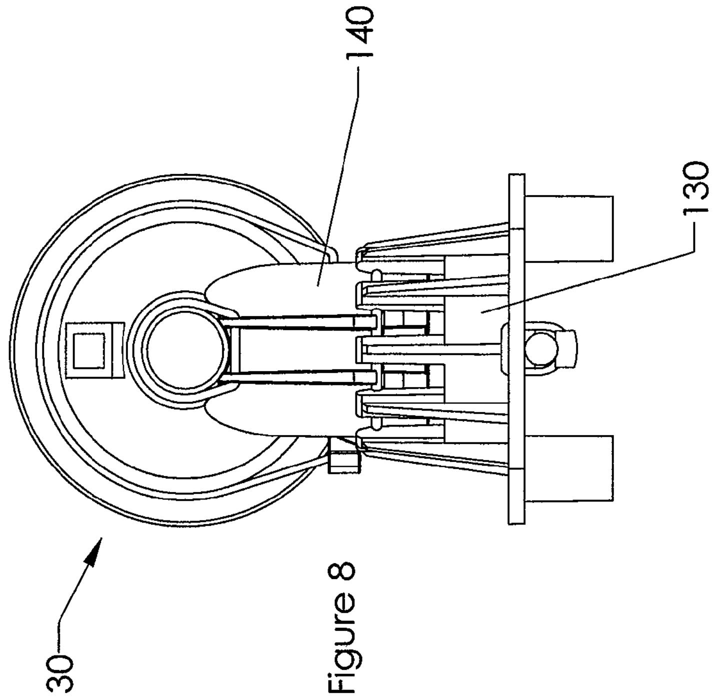
FIG. 8 is the other end view of the fluid dispenser and connectors of FIG. 5.
Figure 7:
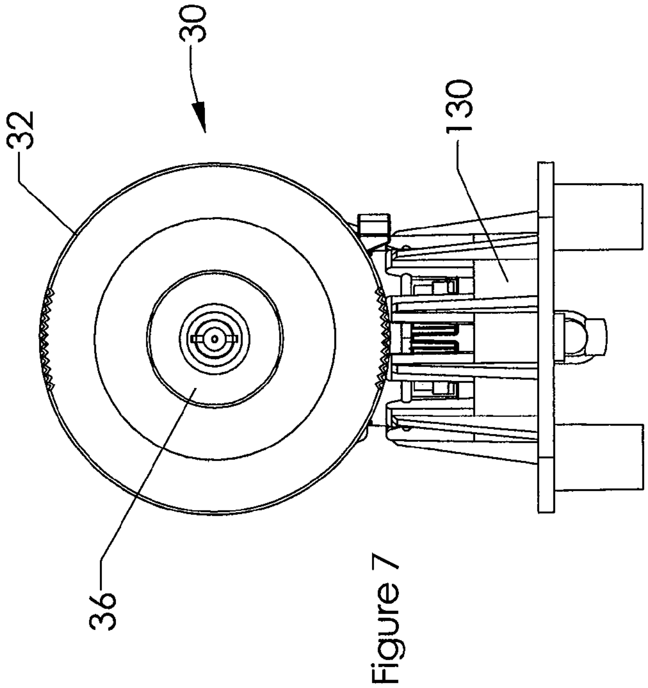
FIG. 7 is an end view of the fluid dispenser and connectors of FIG. 5.
Figure 9:
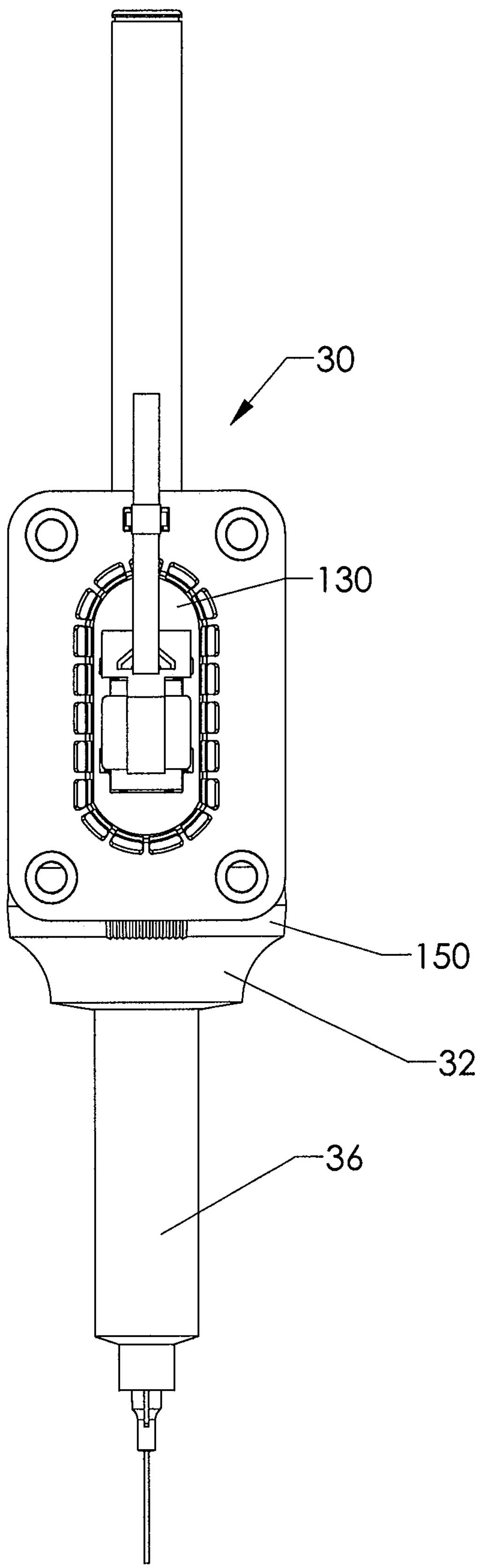
FIG. 9 is a rear view of the fluid dispenser and connectors of FIG. 5.
Figure 10:
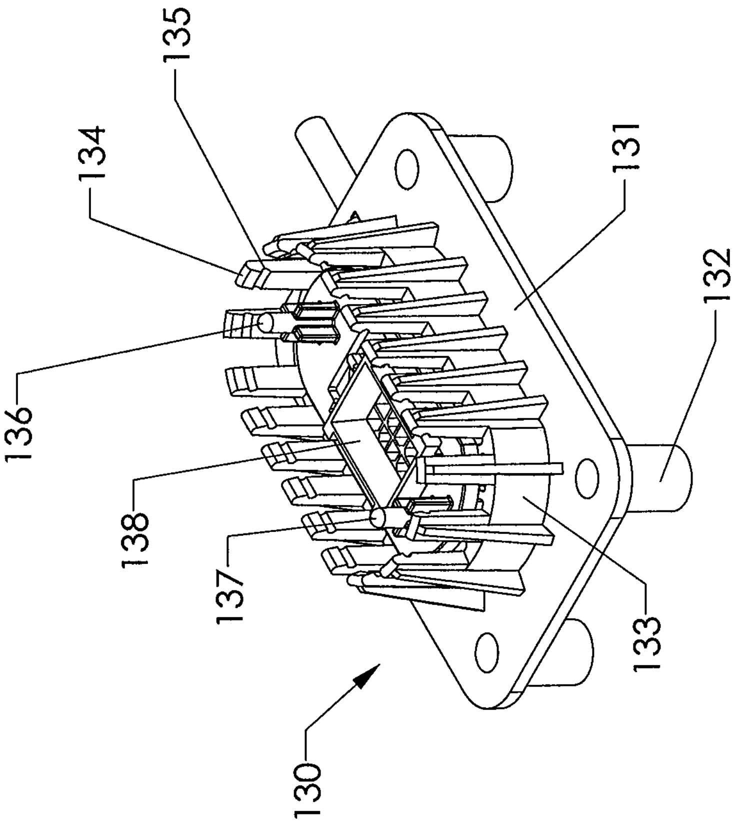
FIG. 10 is an enlarged perspective view of one connector of a connector system.
Figure 11:
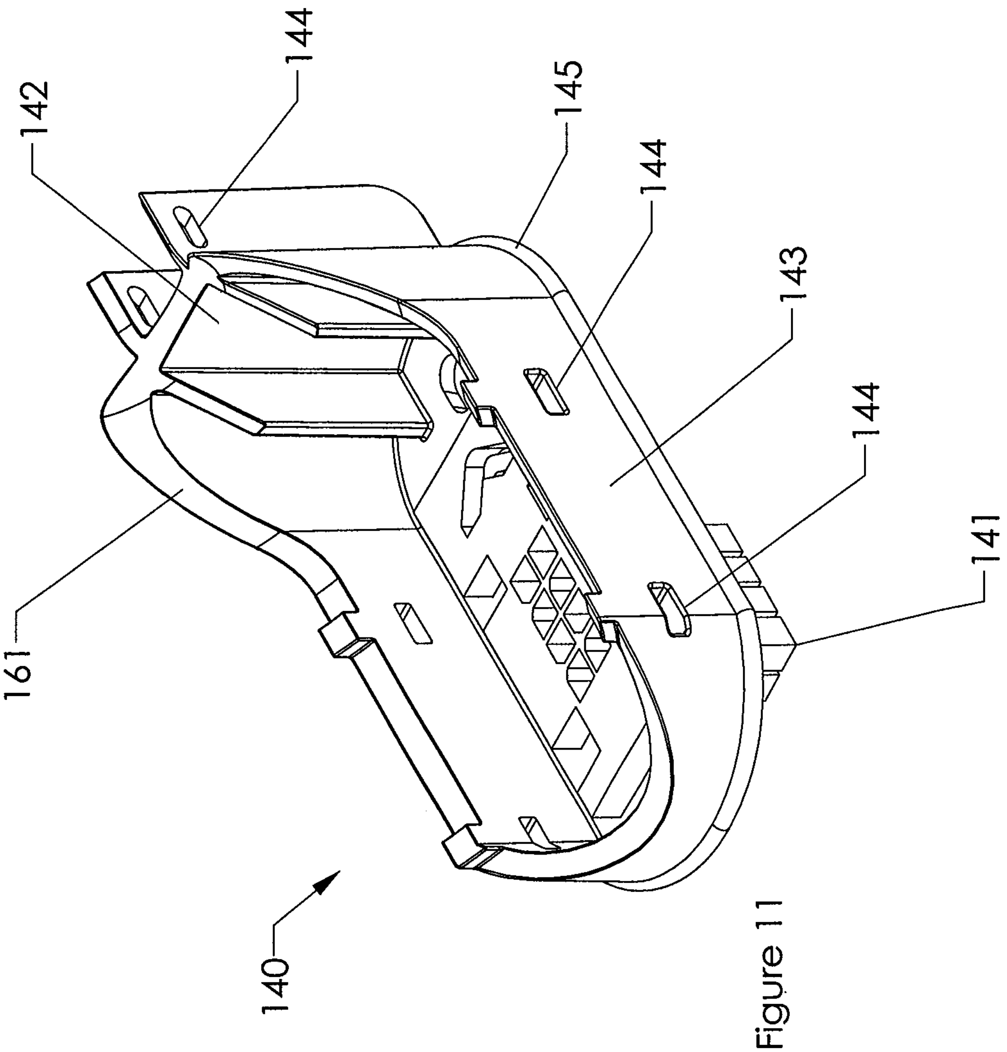
FIG. 11 is an enlarged perspective view of a second connector of a connector system.
Figure 12:
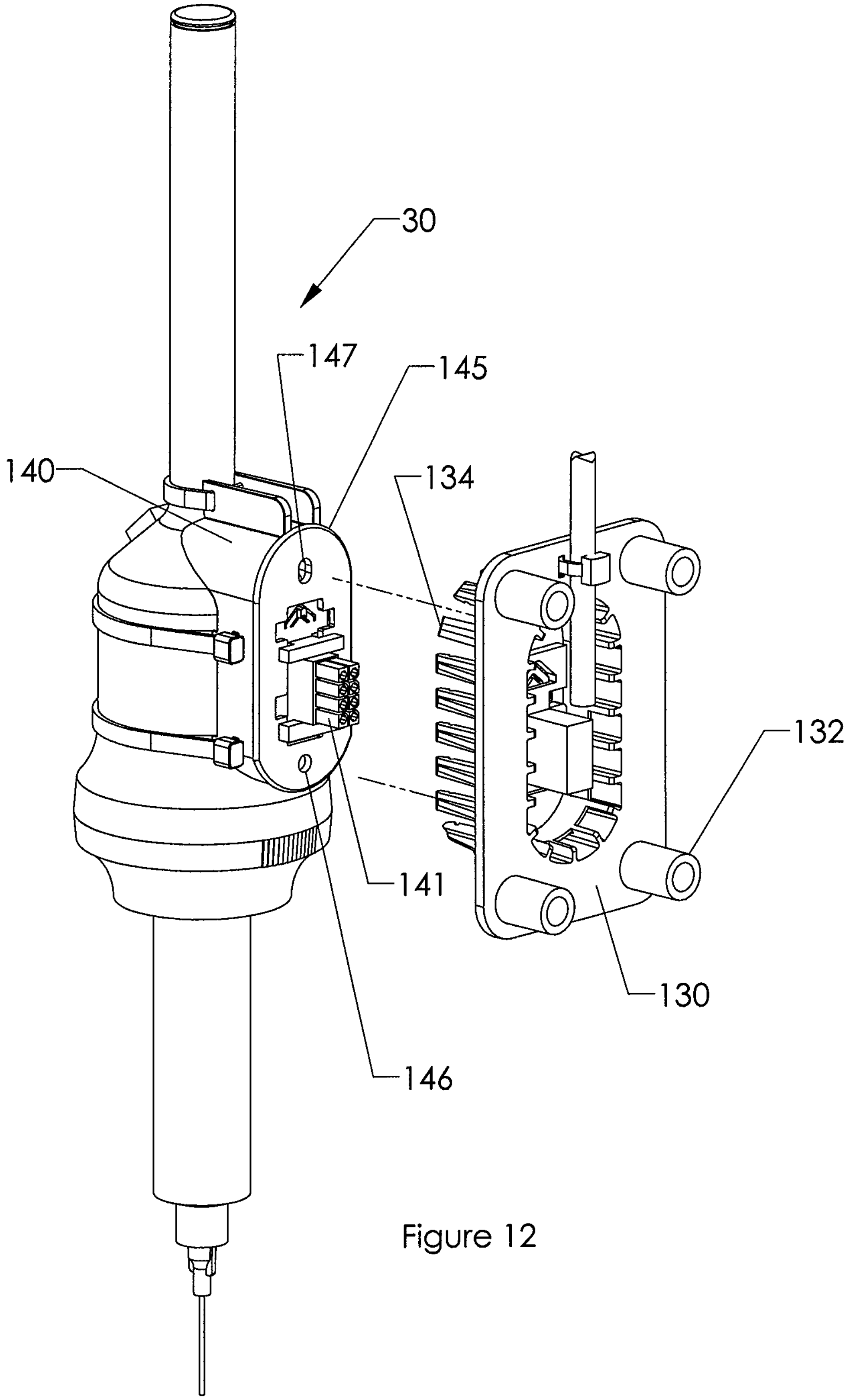
FIG. 12 shows the connectors of FIGS. 10 and 11 before they are mechanically and electrically engaged with each other.

Additional examples of fluid dispensers are depicted in FIGS. 3-12. Fluid dispenser 30, FIGS. 3 and 4, has housing 32 that contains a stepper motor 92 of the type described above. Syringe 36 with dispensing tip 38 is coupled to the stepper motor output shaft 94. FIG. 3 shows drop 40 being dispensed from tip 38. Drop 40 is dispensed onto structure 80 located on table 82. Two-part mechanical and electrical connector system 47 is used to mechanically and electrically couple dispenser 30 to structure 50 that is part of the dispensing system. Connector system 47 comprises first connector 48 that is mechanically coupled to structure 50. Electrical continuity is accomplished via cable 51 that terminates at electrical contacts (not shown) that are part of connector 48. Second, mating connector 44 is mechanically coupled to housing 32 via straps 45 and 46 that encircle portion 34 and mechanically engage with (pass through) connector portion 44. Power and control signals are provided to the dispenser from a controller via mating electrical contacts built into connectors 44 and 48.

FIGS. 5-12 show additional details of a specific embodiment of two-part connector system 120. Connector system 120 comprises one connector 130 that is adapted to be fixed to a dispensing system via posts 132 that project from base 131. Machine screws or other fasteners fit through posts 132. The other connector 140 is fixed to dispenser housing 32 via strap(s) 150; one, two or more such straps may be used, two being shown here. Body 143 of connector 140 defines extension portion 142 that tightly couples to housing 32; surface 161 is shaped to conform to the shape of the outer surface of housing 32 against which it lies, so that connector 140 is almost effectively integral with housing 32. Slots 144 allow straps 150 to pass through body 143; there are one or more (typically, two) slots for each strap. Connectors 130 and 140 may each be unitary; they may be molded from a plastic material such as polyamide 6, 33% glass filled nylon.

Connector 130 further includes projecting flexible fingers 134 that project from body 133. Fingers 134 each define a groove 135 near the distal end. The fingers snap over rim 145 of connector 140 and rim 145 is accepted into grooves 135, to accomplish a positive locking of the two connectors. Fingers 134 circumscribe the entire connector body to define a receptacle for rim 145. Because fingers 134 are made of a plastic material that has some give, and because the fingers have free distal ends, the fingers are sufficiently flexible such that they release rim 145 when connector 140 is pulled away from connector 130. Posts 136 and 137 fit into receiving openings 146 and 147. Male electrical connector portion 141 fits into female electrical connector receiving portion 138, which has sloped sidewalls that guide portion 141 into portion 138. The posts and these guide features help to allow a blind connection of the two connector halves.

Connector system 120 thus accomplishes both mechanical and electrical connection between the dispenser and the dispensing system in a push on-pull off system that can be operated with one hand and without direct sight of the connection location on the dispense system.

The connector system herein could be used to couple fluid dispensers other than syringes. For example the dispenser could be a dispense gun or other device that is electrically operated to dispense a controlled amount of fluid. As another alternative, the fluid dispenser could be a dispense valve, in which case there may not need to be an electrical connection accomplished by the connector system. A further alternative to the fluid dispenser could be a dispense tip such as a needle or other orifice; the connector could be used to hold the tubing leading to the dispense tip and the tip itself, to allow rapid attachment and detachment of them for replacement.

While various embodiments of the innovation have been particularly shown and described, it will be understood by those skilled in the art that various changes in form and details may be made therein without departing from the spirit and scope of the innovation as defined by the appended claims.

What is claimed is:

1. A connector system, comprising:

a first connector component configured to mount to a fluid dispenser and a second connector component configured to mount to a structure;

the first connector component and the second connector component defining a push to connect-pull to disconnect mechanical connector assembly, comprising:

a first mechanical connector associated with the first connector component, the first mechanical connector having a first connector body that defines a first connector face circumscribed by a projecting rim, and a second mechanical connector associated with the second connector component having a second connector body that defines a second connector face circumscribed by a plurality of flexible fingers, the first mechanical connector and the second mechanical connector configured to be disposed between (i) a first position where the projecting rim of the first mechanical connector engages the plurality of flexible fingers of the second mechanical connector to secure the fluid dispenser to the structure and (ii) a second position where the projecting rim of the first mechanical connector is disengaged from the plurality of flexible fingers of the second mechanical structure to release the fluid dispenser from the structure; and the first connector component and the second connector component defining an electrical connector assembly, comprising:

a first electrical connector associated with the first connector component, and a second electrical connector associated with the second connector component, the first mechanical connector and the second mechanical connector configured to be disposed between (i) a first position where the first electrical connector engages the second electrical connector to provide an electrical interconnection between the dispenser and the structure and (ii) a second position where the first mechanical connector is disengaged from the second mechanical structure to release the electrical interconnection between the dispenser and the structure.

2. The connector system of claim 1 wherein the first mechanical connector further includes a plurality of openings defined on the first connector face.

3. The connector system of claim 2 wherein the second mechanical connector further includes a plurality of posts projecting outwardly from the second connector face and configured to fit into the plurality of openings defined on the first connector face.

4. The connector system of claim 2 wherein the second mechanical connector further includes a plurality of posts projecting outwardly from the second connector face and configured to fit into the plurality of openings defined on the first connector face.

5. The connector system of claim 4 wherein the projecting rim of the first mechanical connector is sized and shaped to be accepted into the grooves of the plurality of flexible fingers.

6. The connector system of claim 1 wherein the plurality of flexible fingers are configured to snap over the projecting rim of the first mechanical connector.

7. The connector system of claim 1 wherein the plurality of flexible fingers each define a groove near the distal end of the fingers such that the plurality of flexible fingers are configured to snap over the projecting rim of the first mechanical connector.

8. The connector system of claim 7 wherein the projecting rim of the first mechanical connector is sized and shaped to be accepted into the grooves of the plurality of flexible fingers.

9. The connector system of claim 1 wherein the second connector face is entirely circumscribed by the plurality of flexible fingers.

10. The connector system of claim 1 wherein the plurality of flexible fingers includes more than four flexible fingers.

11. The connector system of claim 1 wherein the plurality of flexible fingers are formed of a plastic material.

12. The connector system of claim 1 wherein the first electrical connector includes one or more sloped sidewalls to guide the second electrical connector into the first position.

13. A connector system, comprising:

a first connector component configured to mount to a fluid dispenser; and a second connector component configured to mount to a structure;

the first connector component and the second connector component defining a push to connect-pull to disconnect mechanical connector assembly, comprising:

a first mechanical connector associated with the first connector component, the first mechanical connector having a first connector body that defines a first connector face circumscribed by a projecting rim, and a second mechanical connector associated with the second connector component, the second mechanical connector having a second connector body that defines a second connector face circumscribed by a plurality of flexible fingers, the first mechanical connector and the second mechanical connector configured to be disposed between (i) a first position where the projecting rim of first mechanical connector engages the plurality of flexible fingers of second mechanical connector to secure the fluid dispenser to the structure and (ii) a second position where the projecting rim of the first mechanical connector is disengaged from the plurality of flexible fingers of the second mechanical structure to release the fluid dispenser from the structure; and the first electrical connector engages the second electrical connector to provide an electrical interconnection between the dispenser and the structure.

14. The connector system of claim 13 wherein the first mechanical connector further includes a plurality of openings defined on the first connector face.

15. The connector system of claim 13 wherein the plurality of flexible fingers are configured to snap over the projecting rim of the first mechanical connector.

16. The connector system of claim 13 wherein the plurality of flexible fingers each define a groove near the distal end of the fingers such that the plurality of flexible fingers are configured to snap over the projecting rim of the first mechanical connector.

17. The connector system of claim 13 wherein the second connector face is entirely circumscribed by the plurality of flexible fingers.

18. The connector system of claim 13 wherein the plurality of flexible fingers includes more than four flexible fingers.

19. The connector system of claim 13 wherein the plurality of flexible fingers are formed of a plastic material.

20. The connector system of claim 13 wherein the fluid dispenser comprises a syringe with a dispensing plunger, wherein the dispenser further comprises a stepper motor operably connected to the syringe and configured to move the dispensing plunger, and wherein the fluid dispenser further comprises a dispenser housing in which the stepper motor is located.

* * * * *